(No Model.)

R. C. BLACKWELL.
RUNNING GEAR FOR WAGONS.

No. 290,170. Patented Dec. 11, 1883.

Witnesses
Rob¹ W. Matthews
Alex F. Roberts

Inventor:
Richard C. Blackwell,
by A. W. Almqvist
Attorney.

UNITED STATES PATENT OFFICE.

RICHARD CHAPMAN BLACKWELL, OF HENDERSON, KENTUCKY, ASSIGNOR OF ONE-THIRD TO WILLIAM HENRY LEWIS, OF SAME PLACE.

RUNNING-GEAR FOR WAGONS.

SPECIFICATION forming part of Letters Patent No. 290,170, dated December 11, 1883.

Application filed November 1, 1882. (No model.)

*To all whom it may concern:*

Be it known that I, RICHARD CHAPMAN BLACKWELL, a citizen of the United States, and a resident of Henderson, in the county of Henderson and State of Kentucky, have invented a new and useful Improvement in Wagons, of which the following is a specification.

The object of my invention is to provide a simple and effective means of preventing the tongue of a wagon from whipping sidewise far enough to beat the legs of the horses when going over rough or uneven ground, while yet allowing the axle of the front wheels of the wagon to turn on the king-bolt for all purposes of guiding the course of travel of the said wagon.

Figure 1:
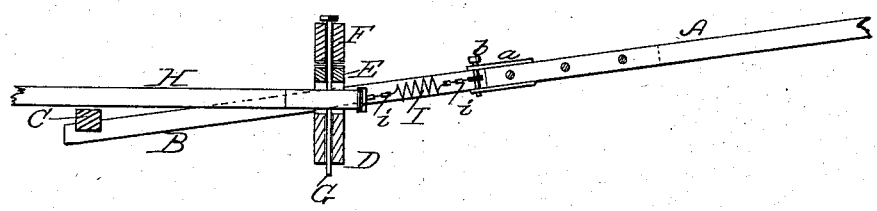
Figure 2:
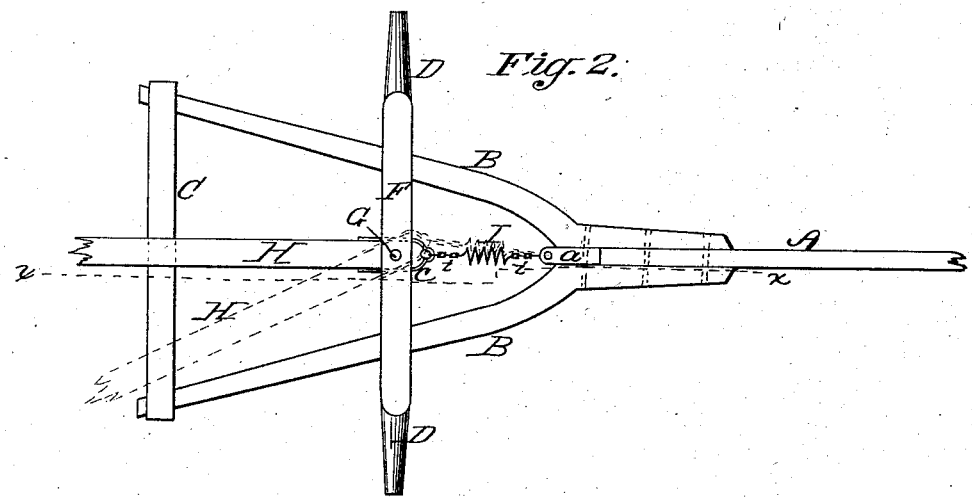

In the accompanying drawings, Figure 1 is a longitudinal vertical section of a portion of the front part of a wagon provided with my improvement, the section being taken on the line $xx$ of Fig. 2. Fig. 2 is a top or plan view of the same.

A is the tongue, B are the hounds, C is the cross-bar between the hounds, D the axle, and E the head-block or sand-board, of a wagon, all rigidly secured together in the ordinary manner. F is the front bolster, and G the king-bolt.

H is the reach or coupling-pole, pivoted at its forward end to the king-bolt G in the usual manner.

When a wagon is drawn over rough or uneven roads, it generally happens that the front wheels, one at a time, strike obstructions, thus causing the tongue to deflect alternately to the right and left, from the sudden impulse received by the wheels striking the obstructions, thus causing said tongue to beat against the legs of the horses. To prevent this, and yet to allow the axle D to turn on the king-bolt G, as required to direct the course of the wagon, I attach to the forward end of the reach H, which should project with its forward end a greater distance than usual forward of the king-bolt G, one end of a spring, I, its other end being fastened to the rear end of the tongue A. A lateral deflection of the tongue relative to the reach (for instance, such as indicated by dotted lines in Fig. 2) will be counteracted by the elasticity of the spring, stretched by such deflection. It is of course not necessary to make the whole length of the connection a spring; but portions thereof may consist of ropes or chains $i$, as shown in the drawings, and which may be fastened at their ends in any suitable manner—for instance, such as shown in the drawings, where the chain forward of the spring is secured to a bolt, (preferably a spring-bolt,) $b$, inserted through holes in lugs $a$ secured to the rear end of tongue A, and the chain rearward of the spring is attached to a clevis, $c$, secured to the forward end of the reach or coupling-pole.

I am aware that a combination of devices has been made in which a spring is used to raise the tongue in order to prevent its forward end from dropping down too far and acting as a load upon the horses.

Having thus described my invention, I claim as new and desire to secure by Letters Patent—

1. In combination with the tongue A, hounds B, reach H, pivoted at the king-bolt, the tension-spring I, connecting the forward end of said reach to the rear end of the tongue, whereby the spring and reach will coact with the king-bolt as a fulcrum, for the purpose set forth.

2. In combination with the axle D, king-bolt G, hounds B, and reach H, having clevis $c$, the tongue A, having lug $a$ and pin $b$, and the spring I, having connecting-chains $i\ i$, as and for the purposes set forth.

In testimony that I claim the foregoing as my invention I have signed my name, in presence of two witnesses, this 30th day of September, 1882.

RICHARD CHAPMAN BLACKWELL.

Witnesses:
 ED. MARRION,
 A. F. KENNEDY.